S. WISWALL.
Extension Wash-Bench.
No. 6,398. Reissued April 20, 1875.
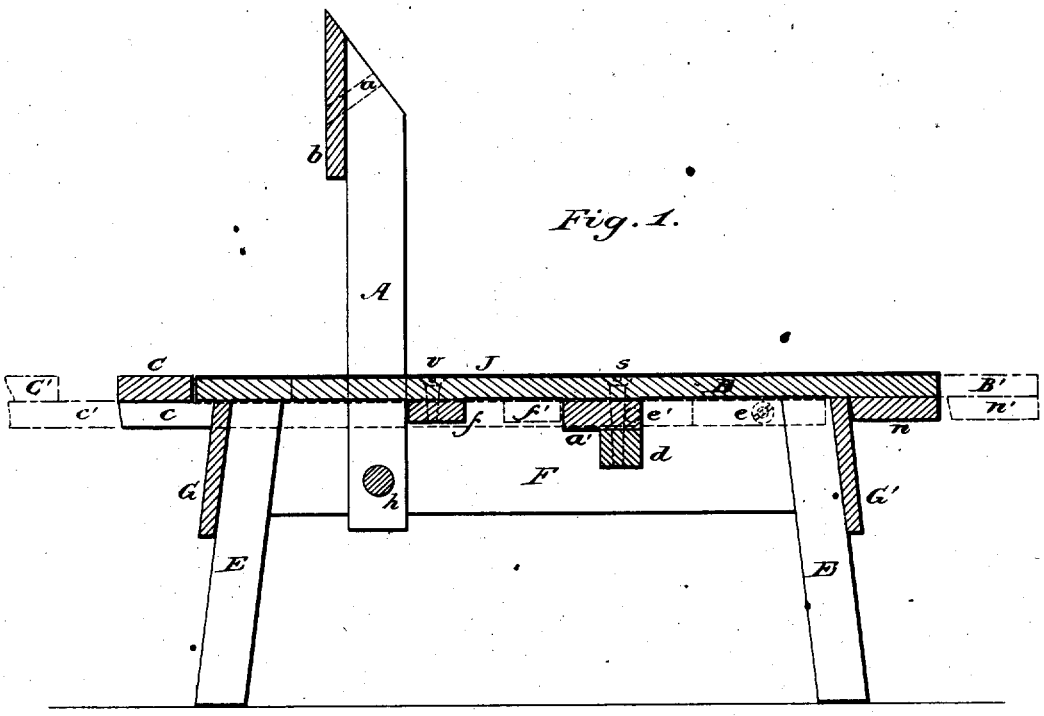
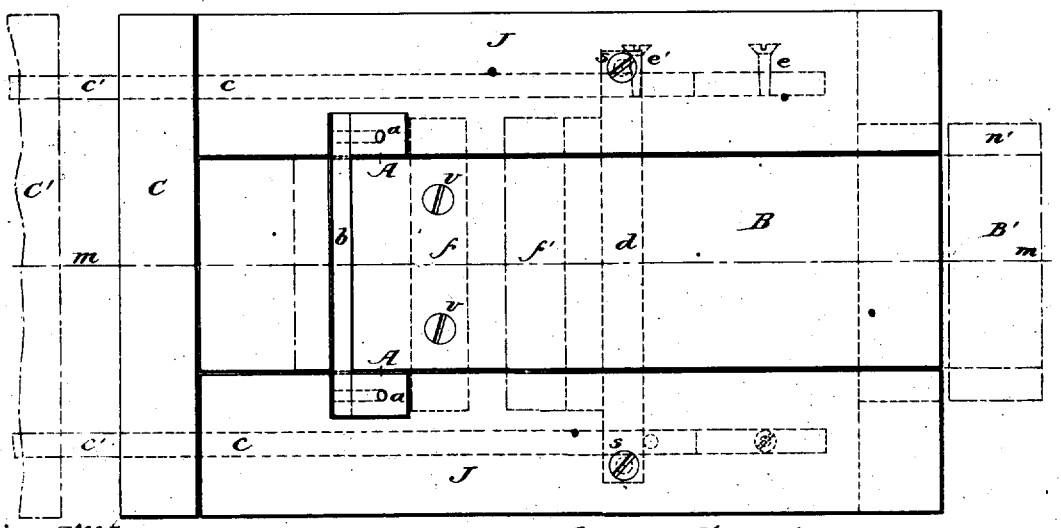
Witnesses:
H. L. Perrine
W. T. Grinnell Jr.
Bailey Washing & Wringing Machine Company, Assignee
Per Souweer & Co.
Attorneys.
THE GRAPHIC CO. PHOTO-LITH. 39 & 41 PARK PLACE, N.Y.

UNITED STATES PATENT OFFICE.

SAMUEL WISWALL, OF HYDE PARK, VERMONT, ASSIGNOR, BY MESNE ASSIGNMENTS, TO THE BAILEY WASHING AND WRINGING MACHINE COMPANY, OF WOONSOCKET, RHODE ISLAND; THE NAME OF SAID COMPANY HAVING BEEN CHANGED TO BAILEY WRINGING MACHINE COMPANY.

IMPROVEMENT IN EXTENSION WASH-BENCHES.

Specification forming part of Letters Patent No. 30,371, dated October 9, 1860; reissue No. 4,097, dated August 9, 1870; extended seven years; reissue No. 6,398, dated April 20, 1875; application filed February 10, 1875.

*To all whom it may concern:*

Be it known that SAMUEL WISWALL, of Hyde Park, in the county of Lamoille, in the State of Vermont, invented a new and useful Improvement in Wash-Benches, of which the following is a specification sufficiently full, clear, and exact to enable others skilled in the art to which the invention appertains to make and use the same, reference being had to the annexed drawing forming a part hereof.

Figure 1 is a vertical section taken on the plane indicated by the line *m m* of Fig. 2. Fig. 2 is a plan or top view.

Similar letters of reference indicate corresponding parts in both figures.

The object of this invention is to provide a convenient wash-bench, upon which may be placed a wash-tub, a soap-dish, a clothes-wringer, and a clothes-basket, the relative position of the tub, the wringer, and the basket being such that the clothes, after being washed, may be passed from the tub through the wringer, and will be deposited into the basket without any rehandling after being fed into the wringer, and the two extension-shelves for the soap-dish and clothes-basket may be slid in when the bench is to be set away, rendering it much less cumbersome than it otherwise would be.

The invention is embodied in a structure which exhibits the attachment of two extension-shelves, and an elevated frame to the ordinary wash-bench.

Use any ordinary wash-bench. One form commonly employed is shown in the drawing, the frame of which is composed of four posts or legs, E, two of which are seen in Fig. 1, the two end boards G and G′, and the two sides F. The top of the bench is composed of the two boards J, Fig. 1, which are nailed to the end boards G and G′. The center board or shelf B is a trifle thinner than the other two, and is made adjustable by fixing the cross-piece *f* to the under side by the screws *v*. The ends of the said cross-piece project under the edge of the boards J. The cross-piece *n* is similarly arranged, but is nailed to the board or shelf B. This shelf rests on the upper edge of the board G′ and upon the cross-bar *a′*, and may be drawn out until the cross-bar *f* strikes the bar *a′*, as shown at *f′*. The bar *a′* rests upon bar *d*, which is mortised through the side boards F, where it is fastened by the screws *s* passing down through the boards J, and into the said bar *d*. The screws *s* also help to secure the top J. The shelf C is nailed to the upper side of one end of the arms *c*, and they are notched into the end board G and slid under the top boards J outside of the side boards F, and their other end rests on the bar *d*. The ends of this bar project far enough beyond the sides F to receive the arms *c* between the said sides F and the screws *s*. The screws *e* answer as stops to prevent the shelf C from being drawn clear out by striking against the screws *s*, as shown by the dotted lines at *e′*, Fig. 2. For the purpose of giving support to a wringing-machine, there are attached to the bench the standards A A. These are notched into the edge of the top boards J, and pass down inside of the side boards F, and are attached to them by the rod *h* passing through said side boards F and posts A A. The board *b* is nailed or otherwise fastened across the top of the posts as a brace. A clothes-wringer may be attached to the top of these posts A, or to the board *b*, by bolts passing through the holes *u*, or other convenient means. The top of the said posts may be beveled, as seen in Fig. 1, in order to throw the bottom of the wringer out over the edge of the wash-tub, which should be placed on the right-hand side of and close to the posts A, and this brings one side of it under the wringer. The shelf B is drawn out, as shown in dotted lines at B′, and a soap-dish is placed upon that end. The shelf C is drawn out, as shown by the dotted lines at *c′*, and a clothes-basket is placed thereon to receive the clothes as they are discharged through the wringer.

What is claimed as the invention is—

1. A wash-bench provided with upright standards, adapted to receive and support wringing-rolls and extension shelf or shelves, substantially as and for the purpose set forth.

2. A wash-bench, provided with upright standards connected by a cross-board and adapted to receive a clothes-wringer, substantially as described.

3. As an article of manufacture, a wash-bench provided with upright standards, adapted to receive and support a clothes-wringer, substantially as described.

BAILEY WASHING & WRINGING MACHINE CO.,
By S. A. BAILEY, *Gen. Agt.*

Witnesses:
D. E. SOMES,
FRANK CHASE SOMES.